United States Patent [19]

Takada, deceased

[11] 3,913,860

[45] Oct. 21, 1975

[54] VEHICLE SAFETY BELT EMERGENCY LOCKING RETRACTION REEL SYSTEM

[75] Inventor: Takezo Takada, deceased, late of Tokyo, Japan, by Juichiro Takada, legal authorized heir

[73] Assignee: Takata Kojyo Co., Ltd., Tokyo, Japan

[22] Filed: Mar. 1, 1974

[21] Appl. No.: 447,445

[30] Foreign Application Priority Data
Mar. 3, 1973 Japan.............................. 48-026291

[52] U.S. Cl........................ 242/107.4; 200/61.58 B
[51] Int. Cl............................................. A62b 35/00
[58] Field of Search...... 242/107.4, 107 B; 297/385, 297/388; 280/150 SB; 200/61.58 B

[56] References Cited
UNITED STATES PATENTS

| | | | |
|---|---|---|---|
| 2,883,123 | 4/1959 | Finnigan | 242/107.4 |
| 3,740,000 | 6/1973 | Takada | 242/107.4 |
| 3,797,603 | 3/1974 | Loomba | 280/150 SB |
| 3,825,205 | 7/1974 | Takada | 200/61.58 B |

*Primary Examiner*—Edward J. McCarthy
*Attorney, Agent, or Firm*—Wolder & Gross

[57] ABSTRACT

An emergency locking safety belt retractor includes a ratchet wheel carrying spring biased belt retractor reel and a braking pawl spring biased into engagement with the ratchet wheel and retained out of ratchet engagement by the almost fully belt rewound reel. A solenoid when energized, retracts the pawl and a first switch is closed and opened by way of a slipping coupling with the belt withdrawal and retraction rotation of the reel. The solenoid switch and a normally closed inertia switch are connected in series across a current source, and the first switch is shunted by an ignition switch.

8 Claims, 5 Drawing Figures

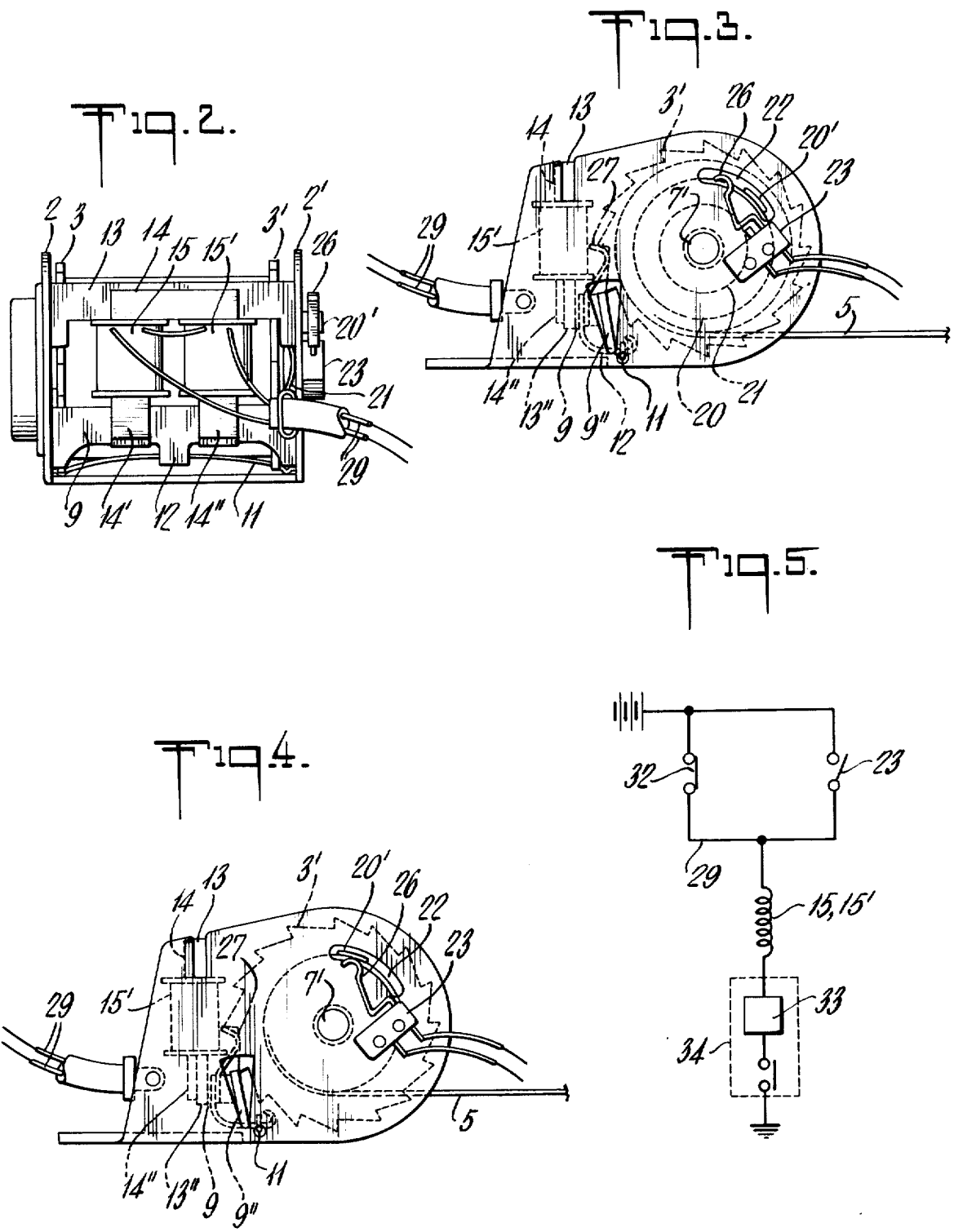

VEHICLE SAFETY BELT EMERGENCY LOCKING RETRACTION REEL SYSTEM

BACKGROUND OF THE INVENTION

The present invention relates generally to improvements in vehicle safety belt retractors, and it relates more particularly to an improved solenoid actuated emergency locking vehicle safety belt retractor reel of the off-lock type, that is of the type wherein deenergization of the solenoid effects the braking of the reel.

In the conventional solenoid operated emergency locking vehicle safety belt retractor system of the off-lock type, in order to permit the vehicle seat occupant to withdrawn the belt from the reel for application, it is necessary for the occupant to follow the practice of releasing the reel to permit the belt withdrawal by retracting the reel locking pawl, either by energizing the solenoid, by manually retracting the pawl, or by other procedures. This practice possesses many disadvantages, since it requires a special knowledge on the part of the seat occupant and additional operations on his part, and without such pre-knowledge, it is impossible to extract the safety belt from the reel for application.

SUMMARY OF THE INVENTION

It is a principal object of the present invention to provide an improved vehicle safety belt retractor.

Another object of the present invention is to provide an improved emergency locking vehicle safety belt retractor system.

Still another object of the present invention is to provide an improved emergency locking vehicle safety belt retractor reel system of the off-lock type which obviates the need on the part of the seat occupant to perform an operation to release the reel to withdraw the belt for application to the occupant.

A further object of the present invention is to provide a system of the above nature characterized by its reliability, ruggedness, simplicity, ease of operation and great versatility and adaptability.

The above and other objects of the present invention will become apparent from a reading of the following description taken in conjunction with the accompanying drawings which illustrate a preferred embodiment thereof.

In a sense, the present invention contemplates the provision of a belt retractor system comprising a reel spring biased to rotate in a belt retracting return direction, a braking member spring biased to an advanced reel braking position and moved to a retracted position by the belt wound on the reel, a solenoid which, when energized retracts the braking member, a first switch transferred to first and second states with the deactuation and actuation of an inertia switch, a second switch transferrable to first and second states with the advance and return rotation of the reel, and means responsive to the first and second switches being in their first states for energizing the solenoid.

In the preferred form of the present system the reel is provided with a ratchet wheel and the braking member is a pawl swingable into and out of engagement with the ratchet wheel and a finger carried by the pawl engages the belt wound on the reel to urge the pawl out of ratchet wheel engagement when sufficient belt is wound on the reel. A clutch plate is in slipping engagement with the ratchet wheel and opens and closes the second switch with the return and advance rotation of the real. The first switch opens and closes with the actuation and deactuation of the inertia switch and the solenoid first and second switches are connected in series to a current source and the second switch is shorted by a manually operated ignition switch.

The improved off-lock belt retractor system obviates the need for any operation on the part of the seat occupant to release the belt retractor reel preparatory to the application of the safety belt, and is reliable, rugged, simple and of great versatility and adaptability, overcoming important drawbacks of the conventional off-lock type of emergency locking vehicle safety belt retractor systems.

BRIEF DESCRIPTION OF THE DRAWINGS

FIG. 2 is a front end elevational veiw of the assembled reel;

FIG. 3 is a side elevational view thereof in a belt retracted unbraked condition;

FIG. 4 is a side elevational view thereof in a belt withdrawn unbraked condition; and FIG. 5 is a schematic diagram of the reel control network.

DESCRIPTION OF THE PREFERRED EMBODIMENT

Figure 1:
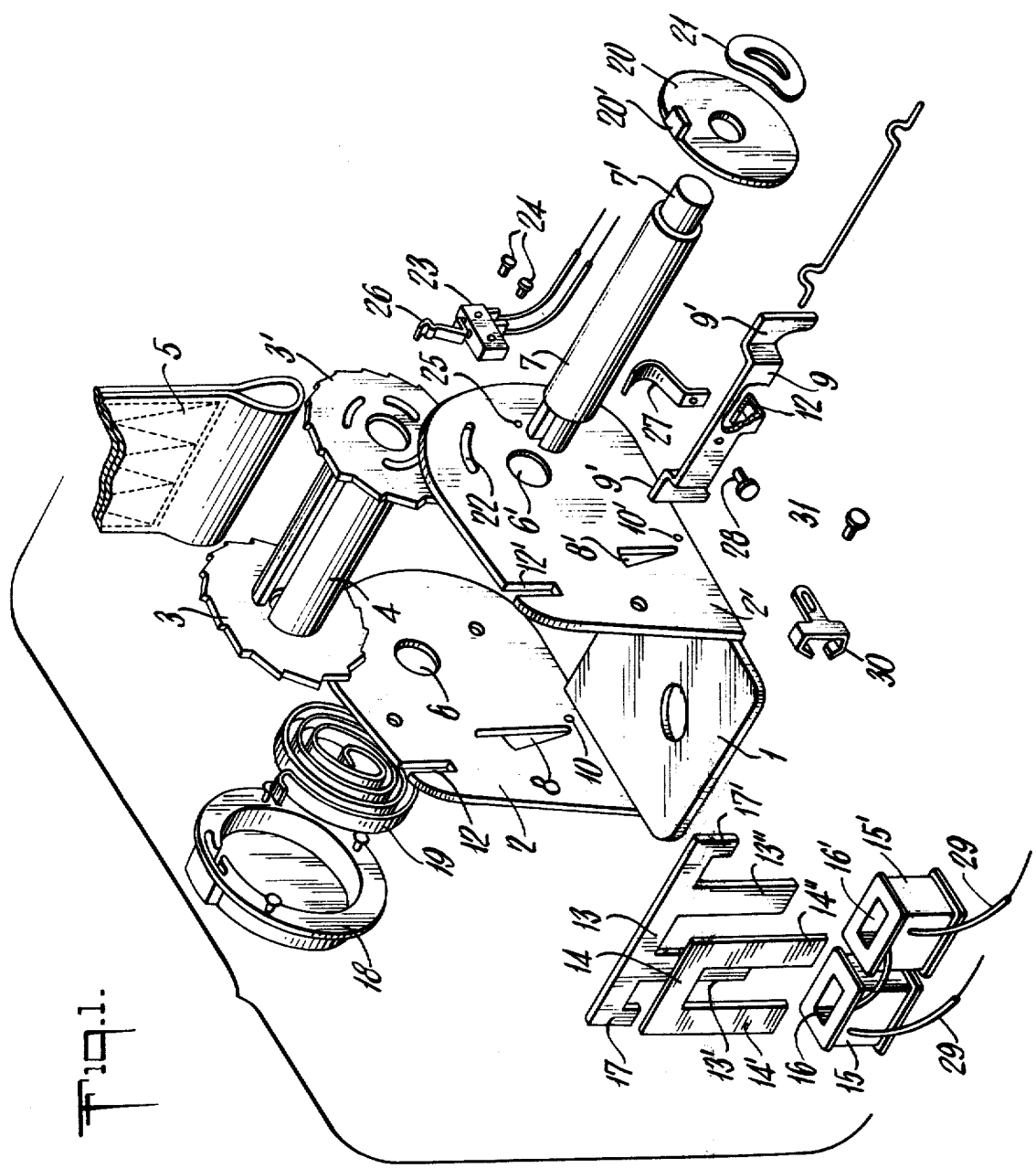
FIG. 1 is an exploded perspective view of a retractor reel embodying the present invention.

Referring now to the drawings which illustrate a preferred embodiment of the present invention, the reference numeral 1 generally designates a U-shaped mounting bracket or frame which includes a base crossweb and opposite side walls or frame sections 2, 2' and constitutes the main body of the emergency locking winding apparatus and is mounted by bolts or the like to the vehicle floor, seat side wall, center pillar or other suitable position. A reel 4 having ratchet wheels 3, 3' on both ends and wound with a safety belt 5 with one end of the belt 5 secured thereto is mounted to a shaft 7 journalled in holes 6,6' formed in the side frame sections 2, 2'. A pawl plate 9 has end portions engaging segmental holes 8, 8' formed in the side frame sections 2, 2' and in the proximity of the ratchet wheels 3, 3', so as to swing a limited angle as restricted by the shapes of the segmental holes 8, 8' whereby the pawl teeth 9', 9'' thereof alternatively engage and disengage the ratchet wheels 3, 3'. A spiral spring 19 for winding the safety belt 5 is contained in a cup shaped housing 18 and is secured to the end of the shaft 7 projecting through the side frame section 2.

As in the conventional safety belt winding apparatus of the above construction, the pawl plate 9 has an L-shaped projection 12, and a wire-shaped pawl spring 11 in and between small holes 10, 10' in the side frame sections 2, 2' in engagement with the L-shaped projection 12 operates to spring bias the pawl teeth 9', 9'' into engagement with the ratchet wheels 3, 3'. The depending leg parts 13', 13'', 14', 14'' of two solenoid cores 13, 14 register with and are secured in the core holes 16, 16' of solenoid coils 15, 15' to unite the solenoid cores 13, 14. The solenoid core 13 is secured to notches 12, 12' formed in the upper front edges of the frame sections 2, 2' by engagement with the end projections 17, 17'. The solenoid core legs 13', 13'' which project below the solenoid coil holes 16, 16' are situated in the proximity of the pawl plate 9 so that the pawl plate 9 functions as an armature and may be drawn into contact with or disengaged from the solenoid core legs 13', 13" with excitation and deexcitation of the solenoid. The solenoid cores 13, 14 are illustrated only by way of example and not limited as to their number.

A clutch plate 20 and a spring washer 21 are rotatably mounted on the small diameter stub shaft 7' of the shaft 7 and in a space between the ratchet wheel 3' and the side frame section 2'. A bent part or longitudinal finger 20' projects from the periphery of the clutch plate 20 outwards through an arcuate elongated slot 22 formed in the side frame section 2' so that, when the reel 4 rotates, the clutch plate 20, kept in tight contact with the ratchet wheel 3' under the spring force of the washer 21, rotates with the ratchet wheel 3' within the extent of the arcuate slot 22 of the side frame section 2'. A normally open microswitch 23 is mounted to the outside of the side frame section 2' and in the proximity of the elongated slot 22 by screws engaging tapped holes 25 so that, when the clutch plate 20 rotates, the finger 20' thereof is engaged with or disengaged from the end part of an actuator lever 26 of the microswitch 23 to operate the microswitch 23. A belt feeler 27 is secured by a rivet 28 to about the center of the pawl plate 9 so as to abut the peripheral surface of the belt 5 wound on the reel 4, in such a way that the teeth 9', 9" of the pawl plate 9 are disengaged from the ratchet wheels 3,3' while the coil of the belt 5 wound on the reel has a large diameter. The pair of conductors 29 from the solenoids 15', 15" are held by a clamp 30 secured by a rivet 31 to the inner surface of the side frame section 2' and one of the conductors is connected through the microswitch 23 shunted by an ignition switch 32 to one terminal of a battery whose other terminal is grounded. The other conductor 29 is grounded through a sensor 34 enclosing a control circuit 33 and an inertia switch of any suitable construction and adapted for sensing the extraordinary changes caused to the vehicle, such as an excessively rapid velocity change or an excessive inclination to open the sensor 34 under such abnormal condition.

Considering now the operation of the improved apparatus, in the electromagnetically operated conventional off-lock emergency locking winding unit, when applying the safety belt, the pawl plate must first be disengaged from the ratchet wheel by energizing the solenoid or by manual operation, otherwise the safety belt cannot be extracted or withdrawn from the winding unit. With the present system the handling procedure is greatly simplified through the omission of this inconvenient and troublesome operation at the time that the seat occupant or passenger applies the safety belt. Before the passenger applies the safety belt, the belt 5 is wound and stored on the reel, under the retraction biasing force of the spring 19. The belt feeler 27 attached to the pawl plate 9 is rocked in a counter-clockwise direction by its contact with the belt 5, as shown in FIG. 3, and the pawl teeth 9', 9" are thus disengaged from the ratchet wheels 3, 3' to permit the belt 5 to be initially freely extracted or reeled out when the passenger withdraws and applies the safety belt. When the belt 5 is wound by the reel, the ratchet wheel 3' and the clutch plate 20 rotate with the reel under the influence of the spring washer 21, and thus the bent part 20' of the clutch plate 20 moves clockwise and comes to a halt in abutting relation with one end of the arcuate slot 22 of the side frame section 2', to thus disengage the actuator lever 26 of the microswitch 23 and the microswitch 23 is thereby opened. Next, when the belt 5 is extracted to be applied to the passenger, the clutch plate 20 is rotated counter-clockwise in sliding contact with the ratchet reel 3'. The bent part 20' thrusts the end of the actuator lever 26 to close the microswitch 23 and excite the solenoids 15, 15'. The solenoid core 13 is thus magnetized, and the legs 13', 13" attract the pawl plate 9 to maintain disengagement between the ratchet wheels 3, 3' and the pawl teeth 9', 9". Accordingly, even when the coil diameter of the belt 5 becomes smaller with reeling out of the belt 5, and the belt feeler 27 is separated from the peripheral surface of the belt 5, the belt 5 can be further freely reeled out to permit its application by and to the passenger. As shown in the diagram of FIG. 5, the solenoids 15, 15' are energized or excited by operation of the ignition switch 32 and the pawl plate 9 is likewise attracted towards the legs 13', 13" of the solenoid core 13 to permit the belt 5 to be freely extracted. In case of an abnormal or emergency situation of the vehicle, such as collision or sudden tilting, the sensor 34 including the inertia switch and the control circuit 33 respond to such situations and operates to open the circuit and de-excite the solenoids 15, 15'. The pawl plate 9 is thereby released from the solenoid core legs 13', 13" under the influence of the spring 11, and the pawl teeth 9', 9" engage the ratchet wheels 3, 3' to lock any reeling out of the belt 5 and assure the safety of the passenger.

As explained above, in the solenoid operated off-lock type emergency locking winding apparatus, in which the solenoid is energized under ordinary situations to permit the free extraction of the belt and de-excited under abnormal situations by the operation of suitable sensor means to effect the braking engagement between the pawl plate and the ratchet wheel and prevent the extraction of the belt, the solenoid is de-excited, except during the operation of the vehicle to thereby reduce the power consumption. The pawl plate is therefore in the emergency lock condition, and the passenger intending to put on the safety belt has to release this lock condition by some measures, otherwise the belt cannot be reeled out. It was therefore necessary to provide a manually operated pawl plate release device consisting of a wire or the like, connected to the pawl plate, or a system consisting of a conductor wire connecting the ignition switch and the solenoid which can be excited by operation of the ignition switch. That is, the lock condition must be cancelled before the passenger applies the belt so that the latter can be freely withdrawn. With the present device, the above procedure is obviated and the solenoid is positively excited through the usual operation of the vehicle passenger in applying the belt to cancel the lock condition. The present device is thus very effective in that the troublesome and inconvenient operation encountered at the time the vehicle seat occupant applies the safety belt is eliminated to enhance the driving safety.

While there has been described and illustrated a preferred embodiment of the present invention, it is apparent that numerous alterations, omissions and additions may be made without departing from the spirit thereof.

I claim:

1. A vehicle safety belt retractor system comprising a reel rotatable in a belt withdrawal advance direction and a belt retraction return direction and spring biased to rotate in a return direction, a braking member movable between an advanced position braking said reel against advance rotation and a retracted position releasing said reel and spring biased to its advanced position, means responsive to at least a predetermined amount of belt wound in said reel for retracting said braking member, a solenoid, means responsive to the energization of said solenoid for retracting said braking member, first switch means including an inertia switch transferrable between first and second states in response to the actuation and deactuation of said inertia switch, a second switch means responsive to the advance and return rotation of said reel for transferring said second switch means to first and second states respectively, and means responsive to said first switch means and second switch means concurrently being in said first states for energizing said solenoid.

2. The retractor system of claim 1 including a third switch means manually transferrable between first and second states, said solenoid being energized in response to said first and third switch means being concurrently in said first states independently of the state of said second switch means.

3. The retractor system of claim 2 wherein said third switch means comprises a vehicle motor ignition switch.

4. The retractor system of claim 1 wherein said first switching means is closed and open in its first and second states respectively, and said second switching means is closed and open in its first and second states respectively and including means connecting said first and second switching means and said solenoid in series to a source of current.

5. The retractor system of claim 4 wherein said third switching means is closed and open in its first and second states respectively, and is connected in parallel with said second switching means.

6. The retractor system of claim 1 wherein said second switch means transferring means comprises a switch actuating member movable between advance and retracted positions to transfer said second switch means to said first and second states respectively, and a slipping clutch coupling said actuating member to said reel to advance and retract said actuating member with the advance and return rotation of said reel.

7. The retractor system of claim 1 including a ratchet wheel rotatable with said reel, said brake member comprising a pawl movable into and out of engagement with said ratchet wheel and spring biased toward engagement therewith.

8. In an electro-magnetically operated emergency locking and winding apparatus of the off-lock type for a safety belt used with vehicles comprising a belt windup reel provided with a pair of circular ratchet wheel disposed inside a U-shaped frame, a pawl plate mounted intermediate the two side frame sections of the U-shaped frame and in the proximity to said ratchet wheels, a pawl spring, a pawl plate actuating solenoid in the proximity to the pawl plate, and a covered helical spring for belt unwinding provided to a reel shaft passed through the frame and outside the U-shaped frame, a sensor including a sensor switch and a control circuit in series with said solenoid, said ratchet wheels being instantly engaged with the pawl plate upon the closure of the sensor switch and the consequent de-excitation of the solenoid via the control circuit, so as to interfere with the reeling out of the safety belt to restrain the passenger to his seat, said sensor switch being operable responsive to the extraordinary situations such as collision, abrupt halt and inclination of vehicles, an emergency locking type winding apparatus having an anti-lock switch operated at first when the user puts on the safety belt, characterized in that a belt feeler is provided to the pawl plate, said anti-lock switch connected in series to the solenoid mounted to the outside of the upright side of the U-shaped frame opposite to the side to which the helical spring is attached, and an anti-lock switch actuating clutch plate and a spring washer slideable with the ratchet wheel and loosely fitted on said reel shaft and in a space defined between the said upright side and the ratchet wheel, and that the apparatus operates in such manner that, when the belt is reeled out at first for the passenger to wear it, the clutch plate is rotated in contact with the ratchet wheel even when the ignition switch is then opened so as to close the anti-lock switch, excite the solenoid, disengage the pawl plate from the ratchet wheel during the early stage of the belt extraction, and facilitate the procedure of putting on the belt.

\* \* \* \* \*